(12) United States Patent
Fortino

(10) Patent No.: US 7,793,916 B2
(45) Date of Patent: Sep. 14, 2010

(54) ELECTRIC-MOTOR-OPERATED VALVE CLOSURE SYSTEM

(75) Inventor: Richard D. Fortino, Midland, MI (US)

(73) Assignee: Powell Technologies LLC, St. Louis, MI (US)

( * ) Notice: Subject to any disclaimer, the term of this patent is extended or adjusted under 35 U.S.C. 154(b) by 1215 days.

(21) Appl. No.: 11/367,071

(22) Filed: Mar. 3, 2006

(65) Prior Publication Data

US 2006/0197044 A1 Sep. 7, 2006

Related U.S. Application Data

(60) Provisional application No. 60/658,617, filed on Mar. 4, 2005.

(51) Int. Cl.
*F16K 31/00* (2006.01)

(52) U.S. Cl. .................... 251/291; 251/129.11; 251/292

(58) Field of Classification Search ............ 137/315.17, 137/315.25; 200/314; 251/129.11, 291, 251/292

See application file for complete search history.

(56) References Cited

U.S. PATENT DOCUMENTS

| | | | |
|---|---|---|---|
| 2,543,090 A * | 2/1951 | Ballou ........................ 200/34 |
| 4,181,288 A * | 1/1980 | Bylsma .................. 251/129.11 |
| 5,226,454 A * | 7/1993 | Cabalfin ...................... 137/870 |
| 6,170,801 B1 | 1/2001 | Powell et al. |
| 6,315,267 B1 * | 11/2001 | Zajac et al. .................... 251/69 |
| 6,782,770 B2 * | 8/2004 | Saito et al. ..................... 74/7 E |
| 6,840,503 B2 | 1/2005 | Fortino |
| 6,908,068 B2 | 6/2005 | Fortino et al. |
| 2003/0066981 A1 * | 4/2003 | Cross et al. .................. 251/292 |
| 2004/0099834 A1 * | 5/2004 | Fortino ........................ 251/292 |

* cited by examiner

*Primary Examiner*—John K Fristoe, Jr.
(74) *Attorney, Agent, or Firm*—George L. Boller

(57) ABSTRACT

A valve closure system (30) for operating a valve (32) of a fluid-holding cylinder (CYL) between an open and a closed position to allow and disallow communication of the interior of the cylinder through the valve. A coupler (118) engages and rotates a stem (40) of the valve. An electric motor (92) rotates the coupler. A square tube (102) on the motor housing surrounds the coupler. A bracket (50) mounts on the valve body. The parts (50, 102) have respective walls shaped to mutually telescopically engage when, with bracket (50) mounted on the valve, the motor housing has been properly circumferentially and axially aligned with the bracket and then advanced to move the coupler toward engagement with the valve stem. The parts (50, 102) may be pinned together by a hitch pin (54).

21 Claims, 8 Drawing Sheets

ELECTRIC-MOTOR-OPERATED VALVE CLOSURE SYSTEM

REFERENCE TO A RELATED APPLICATION AND PRIORITY CLAIM

This application claims the priority of Provisional Application No. US60/658,617, filed on 4 Mar. 2005 naming Richard D. Fortino as inventor.

FIELD OF THE INVENTION

This invention relates to a valve closure system comprising an electric motor for turning a rotary actuator of a valve to operate the valve from open to closed. Such valve closure systems allow valves of vessels, such as cylinders and containers, that hold fluids, such as industrial gases for example, to be quickly operated from a remote location.

Various types of transportable vessels are used for packaging various commercial and industrial gases at superatmospheric pressure. One type of vessel is a gas cylinder, an example of which is an elongate metal tank adapted to contain gas at relatively high pressure. An upper axial end of the cylinder has a neck containing an opening to the interior. A shut-off valve is mounted in closure of the neck opening. Another type is a container, a vessel that may have substantially larger volume than a cylinder. A container may have several such shut-off valves each mounted in closure of a respective opening in the container wall.

A representative shut-off valve comprises a first port fitted in sealed relation to an opening in a vessel wall, a second port, and a valve mechanism that is operable via an external actuator, handle, or tool, to allow and disallow fluid communication between the two ports. The second port is externally available for connection to a gas supply source when the cylinder is to be filled and for connection to a gas utilization system at a facility that uses gas stored in the cylinder. The valve mechanism comprises a stem that is rotated by the external actuator, handle, or tool to open and close the valve. An external actuator may be either manual or powered. An electric- or pneumatic-powered prime mover is an example of a power actuator. A wrench is an example of a hand tool for turning the valve stem.

The representative valve may be a globe style valve whose stem is rotatable more than one full turn between closed and full open positions. Opening the valve allows contained gas to pass from the vessel by entering the first port, flowing through the valve, and exiting via the second port. In such case, the first port forms a gas inlet connected to the vessel, and the second port a gas outlet. The gas outlet may be connected via a conduit to a point of use of the gas.

Such vessels can hold gases that may be considered hazardous, examples of such gases including chlorine and sulfur dioxide. A facility that utilizes one or more of such gases in a process, or processes, conducted at the facility may, for example, have any number of such vessels containing the same or different gases on the premises. When connected to a gas handling system at the facility, such vessels are able to deliver gas, or gases, into the system once their shut-off valves have been opened.

Because of inherent characteristics of certain gases, vessels that contain them may be housed in locations that are remote from attending personnel, and/or the vessels may be in use at times when personnel are absent.

When a vessel, or vessels, is, or are, in use at a facility, and gas leakage is detected, it may be appropriate to shut off all vessels in an attempt to minimize further gas leakage.

Accordingly, an automatic gas leak detection and valve shut-off system may be employed at a facility to address such a situation. Such a system may include a power actuator associated with the shut-off valve of each vessel. Examples of known valve closure systems include electromechanical actuators and pneumatic actuators.

Commonly owned U.S. Pat. Nos. 6,170,801 and 6,840,503 disclose valve closure systems for gas-containing vessels. When mounted on a vessel, a valve closure system associates with a valve having a rotatable stem that opens and closes the valve. The closure systems described in those patents comprise mounting brackets and air motors. With the valve open, the bracket is fit to the valve and a coupling on an external end of the air motor shaft is fit to the valve stem. The long axis of the air motor is coincident with the axis of the stem, or at a right angle to the valve stem. When pressurized air is delivered to the air motor, the motor shaft rotates the stem in a sense that closes the valve.

In certain facilities that use those types of valve closure systems, compressed air either may not be readily available or else may not be a preferred power source for operating the valve closure systems. In such instances, an electromechanical operator like an electric motor may be preferred.

Because a valve closure system must be removed when a gas cylinder is empty and thereafter installed on a fresh replacement cylinder, it is believed important for an electric-motor-operated valve closure system for such gas cylinders to be relatively light in weight and convenient to remove and install. Because space considerations may also be important in such facilities, minimizing the overall dimensions of a valve closure system is believed conducive to customer acceptance of a particular design. For example, the long axis of an electric motor affects the overall length of a valve closure system, and keeping that dimension as small as possible is apt to be desired by certain users.

When an electric motor is direct coupled in-line with a valve stem, the motor shaft will turn the valve stem in one-to-one correspondence (i.e. a 1:1 ratio) unless there is an intervening gear reduction mechanism. By providing a gear reduction mechanism, a smaller motor can be used to meet the valve torque requirements.

Parts for mounting valve closure systems on gas cylinders may, but do not necessarily, include a standard part commonly called a yoke that is clamped to the valve body and typically serves to embrace a fitting that connects a hose to a port of the valve. After having been fitted onto a valve body, the yoke is fastened in place by tightening a screw in a threaded hole in one side of the yoke to clamp the yoke to the valve body. Additional mounting parts serve to locate and support the valve closure system on the valve body and provide for the shaft of the operator to assume operative coupling with the valve stem.

The in-line coupling of the operator shaft to the valve stem typically has a non-circular transverse cross section that fits to a similarly shaped stem to provide for torque transmission to the stem. When the valve closure system is being installed, an installer may have an obstructed view of the coupling and stem and therefore an inability to easily judge when proper circumferential registration between the stem and coupling is attained so that the coupling can come into driving engagement with the valve stem. If the coupling is out of registration with the stem, the installer must perform some sort of manipulation in order to secure registration, and that may be an inconvenient task whose avoidance would be desirable.

Also, a valve closure system should be sufficiently rugged and durable for the environmental and operating conditions that it is expected to encounter when placed in use.

SUMMARY OF THE INVENTION

The present invention relates to further improvements in valve closure systems for fluid-containing vessels, the term "fluid" including both liquids and gases.

Briefly, and without limiting the scope that is defined by the claims, the invention comprises, in a disclosed presently preferred embodiment: a novel organization and arrangement of mounting parts, that may include a standard yoke, for enabling personnel to conveniently install and remove a valve closure system on and from a gas cylinder; and an electric motor that not only can turn the valve stem of a gas cylinder shut-off valve for opening and closing the valve, but also can be conveniently jogged to allow a coupling on the end of the motor shaft to readily attain proper circumferential registration with the valve stem during installation of the valve closure assembly on a gas cylinder.

The inventive valve closure system is also relatively compact, light-weight, and durable. It can be used on a gas cylinder whose valve turns about a vertical axis and also on a gas cylinder whose valve turns about a horizontal axis.

The preferred embodiment of the inventive closure system is well suited for use with known, and commonly used, gas shut-off valves, although certain principles are generic to use of the inventive system with different forms of shut-off valves. Certain principles of the invention may also extend to valve closure systems in which the fluid storage medium is a form of storage vessel other than the particular container and cylinder vessels mentioned above.

One generic aspect of the invention relate to a valve closure system for operating a valve of a fluid-containing vessel between an open and a closed position to allow and disallow communication of the interior of the vessel through the valve. The valve closure system comprises: an operating part shaped to engage and rotate a rotary actuator protruding from a valve body to operate the valve from one position to another when the valve closure system is associated with the valve; a motor for rotating the operating part; a walled located part disposed on a housing of the motor; and a walled locating part shaped for mounting on the valve body, the walled parts respectively comprising respective walls shaped to mutually telescopically engage when, with the locating part mounted on the valve, the motor housing has been properly circumferentially and axially aligned with the locating part and then advanced to move the operating part toward engagement with the rotary actuator of the valve.

Another generic aspect relates to a valve closure system for operating a valve of a fluid-containing vessel between an open and a closed position to allow and disallow fluid flow with respect to the interior of the vessel. The valve closure system comprises: an electric motor for rotating an operating part that is shaped to engage a rotary actuator of a valve for operating the valve from one position to another when rotated by the motor; a mounting via which a housing of the motor is constrained against rotation relative to a body of the valve when the motor rotates the operating part while the latter is engaged with the rotary actuator; and a jogging switch disposed on the motor housing for jogging the motor to turn the operating part to a proper position for engagement with the rotary actuator of the valve when the motor is being operatively associated with the valve.

Still another generic aspect of the invention relates to a method of associating a motor-operated valve closure system with a valve of a fluid-containing vessel for operating the valve, via a rotary actuator of the valve, between an open and a closed position to allow and disallow communication of the interior of the vessel through the valve. The method comprises: circumferentially and axially aligning a located part on the motor with a locating part on the valve and advancing the motor toward the valve to mutually telescopically engage respective walls of the located and locating parts and couple an operating part coupled to the motor to the rotary actuator to couple the rotary actuator to the motor.

The accompanying drawings, which are incorporated herein and constitute part of this disclosure, illustrate a presently preferred embodiment of the invention, and together with the written description given herein disclose principles of the invention in accordance with a best mode contemplated at this time for carrying out the invention.

DETAILED DESCRIPTION

Figure 1:
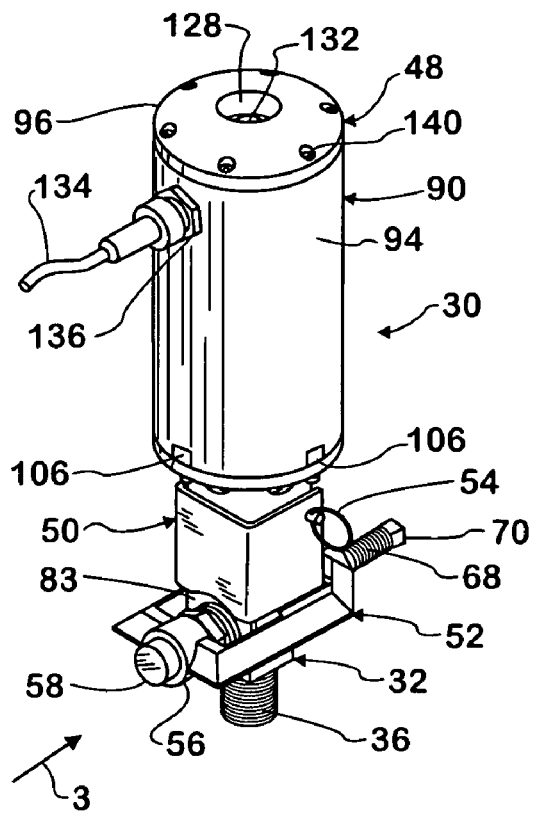
FIG. 1 is a perspective view showing a presently preferred embodiment of the inventive valve closure system mounted on a gas cylinder valve.
Figure 2:
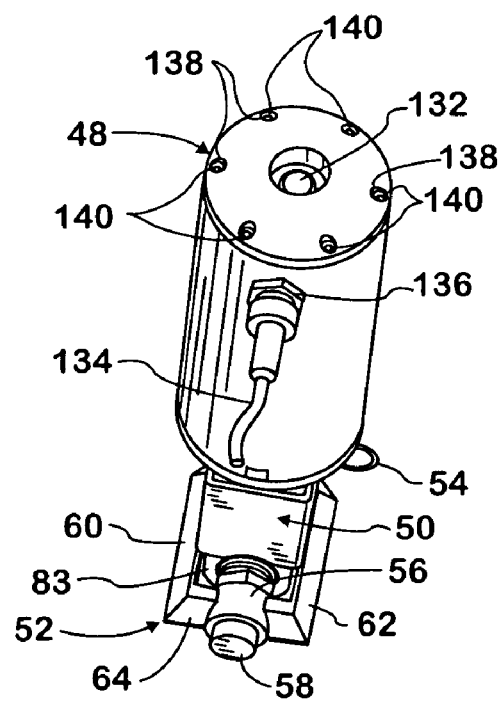
FIG. 2 is another perspective view looking in a different direction.
Figure 3:
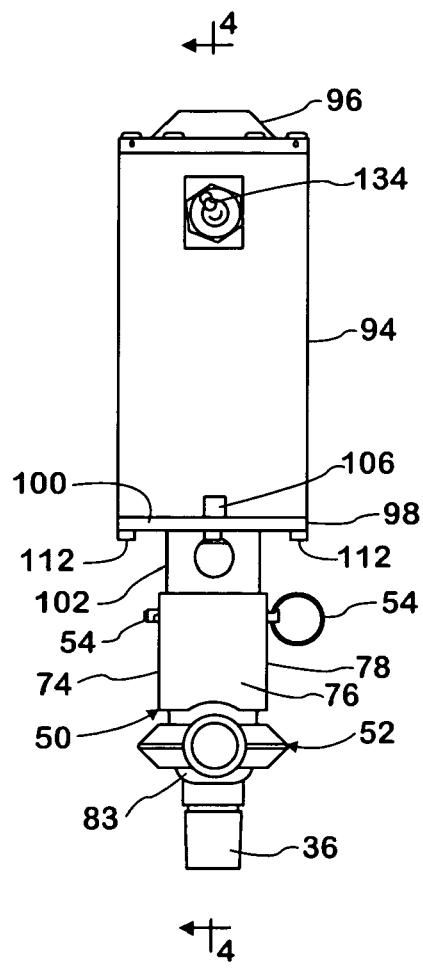
FIG. 3 is an elevation view in the direction of arrows 3 in FIG. 1.

The drawing FIGS. 1-6 illustrate one presently preferred embodiment of cylinder valve closure system 30 according to principles of the invention intended for association with a cylinder valve 32. Those drawings show a vertical installation, but the closure system can also be installed horizontally when the valve axis is horizontal.

Figure 13:
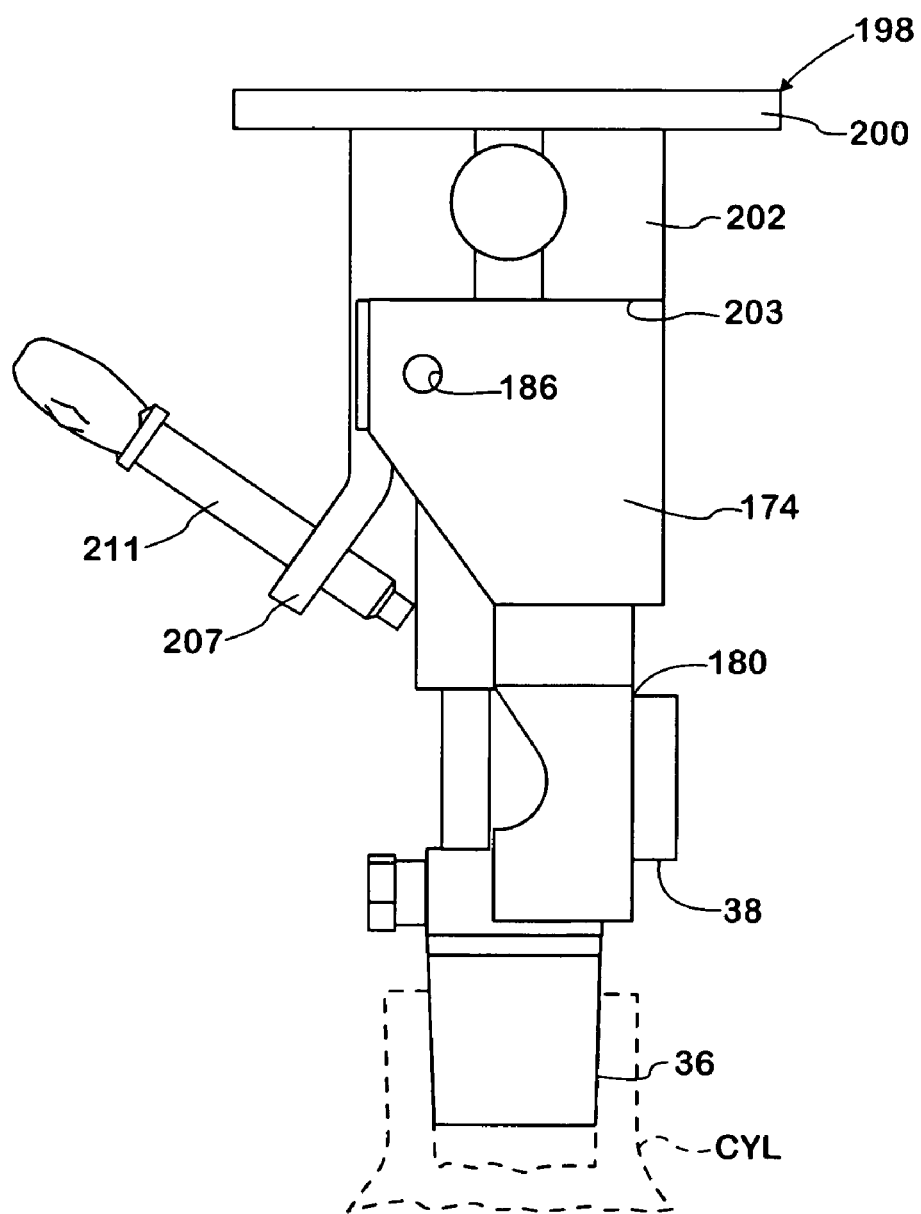
FIG. 13 is a side elevation view of the parts of FIGS. 7 and 10 in mutual association mounting a motor of the valve closure system on a valve.

Valve 32 is a commercially available cylinder tank shut-off valve that comprises a body 34 having a first port 36 at the bottom and a second port 38 at a side. Port 36 is adapted to fit in sealed closure of an opening in a neck at the top of a gas cylinder CYL (not shown in FIGS. 1-6, but shown in phantom in FIG. 13). Port 38 is adapted for connection to a gas supply source when the cylinder is to be filled with gas. When the cylinder is in use at a facility, port 38 is connected to a gas handling system through which gas can flow from the cylinder to a point of use at the facility.

Valve 32 further includes an operating mechanism comprising a valve element within body 34 that is operated to open and close an internal gas flow path between ports 36 and 38. The valve element is operated by turning an actuator, which for the illustrated valve, is a stem 40 on the exterior of body 34. The turning of stem 40 occurs as rotation about an axis 42. Stem 40 has a polygonally-shaped transverse cross section (a square shape for example) that can be engaged by a complementary shaped tool or socket for turning the stem. At the location where stem 40 protrudes from valve body 34 is a hexagonal-shaped head 44 that is concentric with axis 42. Immediately below, and concentric with head 44, body 34 has a cylindrical wall 46 of smaller diameter that allows portions of head 44 to protrude radially outwardly and overhang wall 46.

Figure 6:
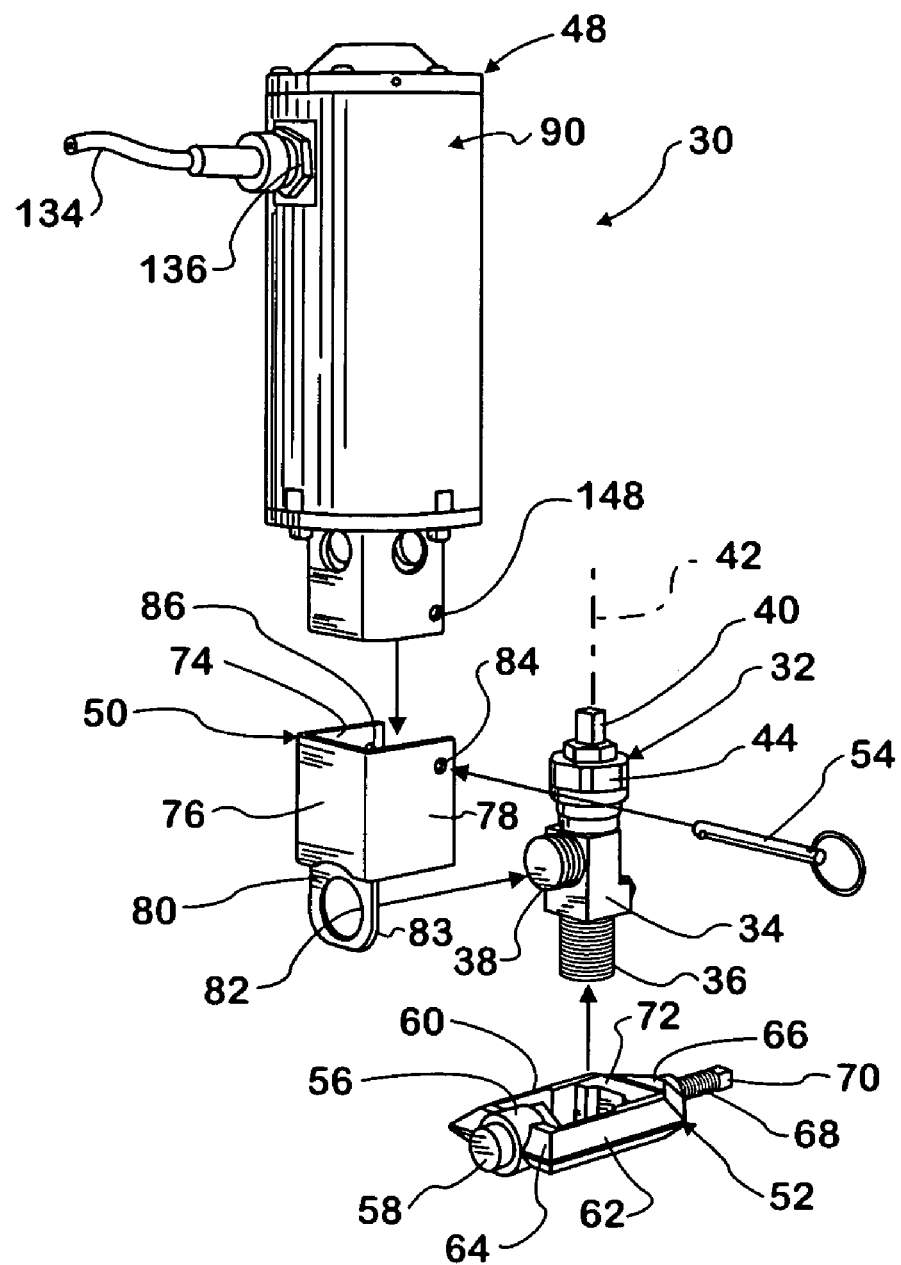
FIG. 6 is a perspective view useful in understanding the installation and removal sequences for installing and removing the valve closure assembly on and from the valve.
Figure 7:
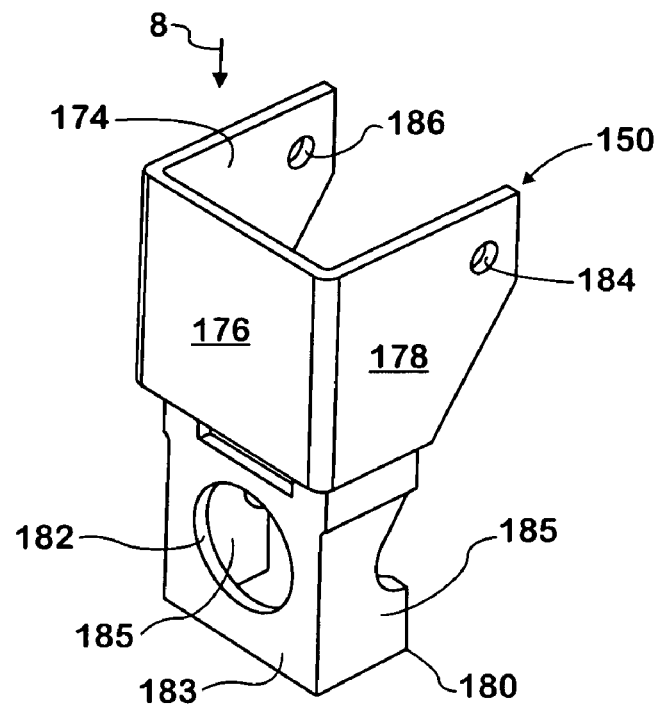
FIG. 7 is a perspective view of a multi-piece part corresponding to, but different from, one of the parts previously described.
Figure 8:
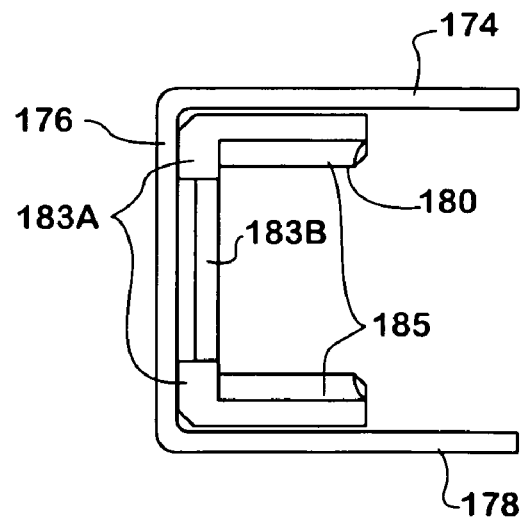
FIG. 8 is a top view in the direction of arrow 8 in FIG. 7.

FIG. 6 shows a motor assembly 48, a bracket 50, a yoke 52, and a hitch pin 54. Yoke 52 is shown in engagement with a fitting 56 on one end of a hose of conduit 58 forming a portion of the gas handling system to which port 38 of valve 32 is connected when in use at a typical facility that uses valve closure systems. Yoke 52 is a standard part for that may be used on gas cylinder valves at such facilities and comprises what is essentially a four-sided rectangular frame having two longer sides 60, 62 and two shorter sides 64, 66. Side 64 has a discontinuity at its center that allows that side to embrace fitting 56. Side 66 has a threaded hole at its center into which a screw 68 is threaded. Turning of screw 68 via a wrench surface 70 at one end in opposite directions advances and retracts a clamp 72 at the other end for clamping and unclamping yoke 52 to and from valve body 34. In this way, yoke 52 accomplishes its usual purpose of holding fitting 56 on valve 32 after the fitting has been threaded and properly tightened to port 38 typically with a suitable sealing gasket between the port and the fitting. In certain valves, port 38 is externally threaded.

As will become apparent from following description, yoke 52 may be considered part of the valve closure system shown in FIGS. 1-6 because in so holding fitting 56 to valve body 34, the yoke constrains movement of the bracket 50 on the valve body while also preventing removal of the bracket from the valve body. General principles of the invention however do not require that such a standard yoke be present.

Bracket 50 comprises a length of three-sided channel stock having side walls 74, 76, and 78. A metal piece 80 is formed to have a right-angle bend 81 in FIG. 4. To one side of bend 81, piece 80 has a collar 83 containing a circular through-hole 82. To the other side of bend 81, piece 80 is notched to provide clearance for valve 32 while endowing the piece with two legs 85 that join respectively with side walls 74, 78 to secure piece 80 to the channel stock. Through-hole 82 is large enough to fit over port 38 while side walls 74, 76, and 78 bound the valve on three sides. Aligned through-holes 84, 86 at the upper corners of side walls 78, 74 opposite piece 80 are clear of the valve body when bracket 50 is installed on the valve.

Figure 5:
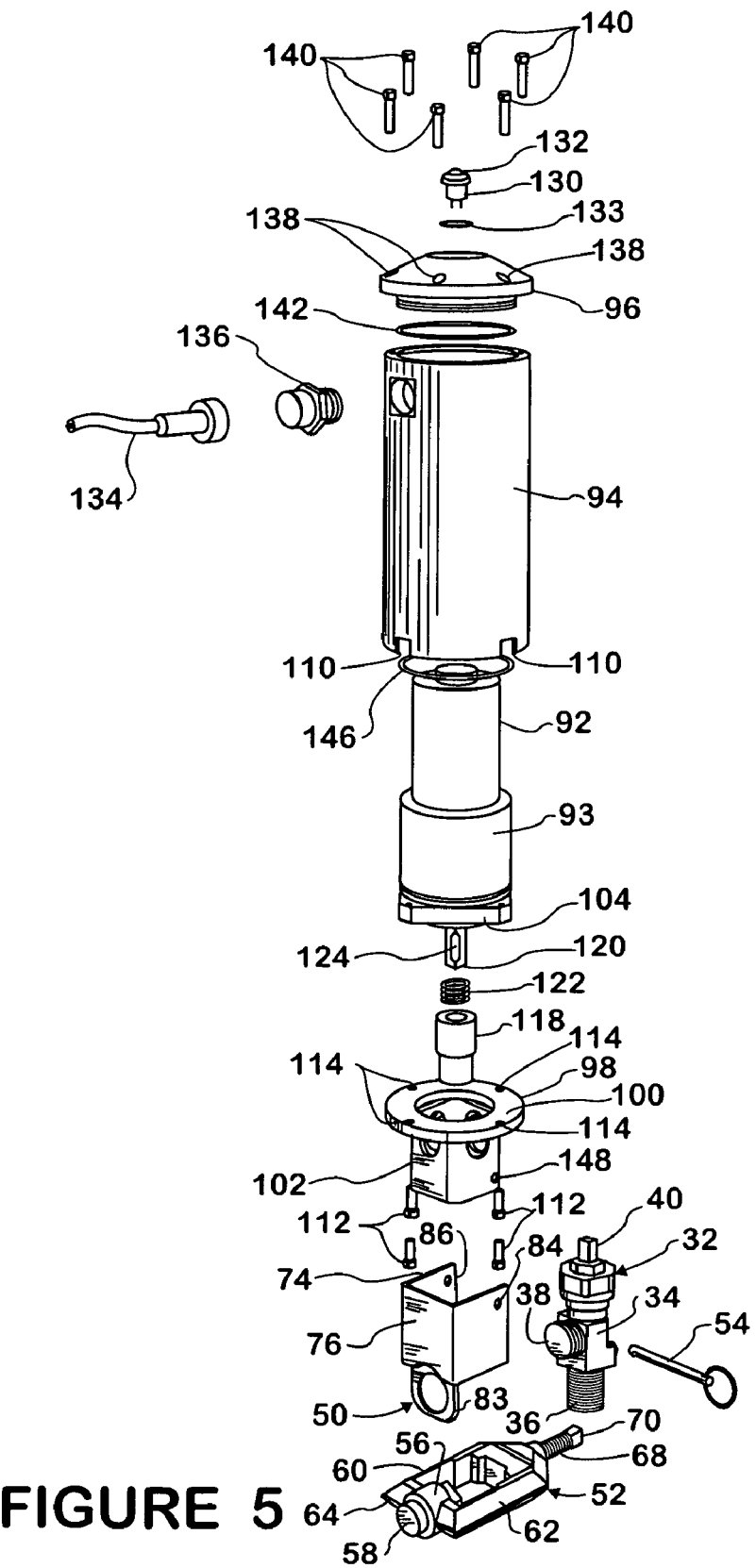
FIG. 5 is an exploded perspective view of the valve closure system and the valve.

Motor assembly 48 comprises a multiple part housing 90 that provides an enclosure for an electric motor 92 and a casing 93 that contains a planetary gear drive. Housing 90 comprises a cylindrical side wall 94 having an open upper end closed by a removable cap 96 and a lower end to which a bracket 98 is fastened. FIG. 5 shows bracket 98 to comprise a flat circular ring 100 and a length of square tube stock 102 joined to and extending downward from and coaxial with ring 100. Tube stock 102 comprises four apertured side walls dimensioned to provide the tube stock with a telescopic fit to bracket 50.

FIG. 5 also shows an end plate 104 that has four locator tabs 106 protruding radially beyond the nominal inside diameter of side wall 94 at 90° intervals about a main longitudinal axis 108 of motor assembly 48. End plate 104 is one end part of casing 93. Motor 92 is secured to another end part of the gear drive casing opposite end plate 104. Motor 92 and casing 93 are secured in proper position in motor assembly 48 by assembling them into the housing through the open lower end of side wall 94 to lodge tabs 106 into mating notches 110 arranged at 90° intervals about axis 108 in the end margin of side wall 94. Bracket 98 is then placed axially of the lower end of side wall 94 and advanced toward the side wall to capture tabs 106. Four screws 112 pass through aligned clearance holes 114 in ring 100 and in the four tabs 106 and are tightened in tapped holes 116 in side wall 94.

A coupler 118 is assembled to an output shaft 120 of motor 92 in a manner that allows the coupler to move axially on the shaft without falling off. A spring 122 is disposed between end plate 104 and an inner end of coupler 118 effectively resiliently biasing the coupler in the direction away from the interior of housing 90 while allowing the coupler to move axially toward the interior against the spring bias force. Coupler 118 has a circumferentially keyed connection to shaft 120 and provides a socket having a shape for fitting to stem 40 so that motor torque can be transmitted through the coupler to turn stem 40. The end portion of shaft 120 has an elongate slot 124 parallel to the shaft length. A spring pin (not shown) passes through a circular radial hole in the coupler wall, through slot 124, and a circular radial hole in the opposite portion of the coupler wall causing the coupler to be kept on the shaft end, but allowing the coupler to position itself axially along the shaft end. The lost motion allows for some tolerance in length of the valve stem and the extent of stem displacement while turning. The limited displacement travel serves to accommodate axial travel of the valve stem as the stem is being rotated, but it does not allow coupler 118 to lose driving engagement with the valve stem while the system remains installed.

The planetary gear drive provides a gear reduction between the motor and the valve stem to amplify the motor torque to proper level for turning the valve stem. The use of a planetary gear drive also contributes to robustness of the motor assembly.

Cap 96 has a dome 126 surrounding a circular walled cavity 128. A push-button switch 130 is mounted on a bottom wall of the cavity. The button actuator 132 is on the outside of the housing interior where it can be depressed by thumb or finger. It does not however protrude above the rim of dome 126, thereby requiring a person's thumb or finger to enter the open top of the cavity in order to actuate switch 130. The mounting is made weather-tight by an O-ring gasket 133 sealing the switch housing to the cap.

Electric wires inside a conduit 134 provide power to switch 130 and motor 92. Switch 130 and motor 92 are arranged in circuit with power supplied by the electric wires such that pressing button 132 to actuate switch 130 causes motor shaft 120 to turn only in a direction that will act to open valve 32. This assures that the installer will not inadvertently close an otherwise open valve, an important consideration at certain facilities such as water treatment plants. The circuit arrangement provides for the actuation of switch 130 to energize a solenoid that operates contactors through which current is carried to the motor. In that way, the switch carries only a small current because the larger motor current doesn't pass through the switch. And as mentioned before the actuation of switch 130 causes the motor to operate only in a direction that will open a valve so that an already open valve will not be inadvertently closed by jogging the motor when the coupler is engaged with the valve stem. The solenoid is located in a control panel that is remote from the motor assembly.

Conduit 134 is secured in a weather-tight manner to motor assembly 48 via a fitting 136 that tightened in a threaded hole in side wall 94. In addition, there are electric wires from a remote control panel that will operate the valve closure system to close an open valve in situations where valve closing is called for.

Cap 96 has a series of six through-holes 138 in its outer margin. Six screws 140 pass through the six holes 138 and are tightened in tapped holes in the upper end of side wall 94 to fasten cap 96 to the side wall thereby enclosing motor 92 at that end of the motor assembly. An O-ring gasket 142 is received in a circular groove in the radially outer surface of a short cylindrical wall 144 that fits closely to the inside of side wall 94 to make the cap-to-side wall joint weather-tight.

An O-ring gasket 146 seals the motor housing to side wall 94 in a similar way at the lower end of the motor assembly.

The foregoing description now allows the installation and removal of the valve closure system to be explained. First, with screw 68 backed off, the distance between clamp 72 and side 64 of yoke 52 allows the yoke to be placed over valve 32 until it rests on the gas cylinder (not shown). Then bracket 50 is placed on the valve by aligning hole 82 with port 38 and moving the bracket radially to insert the port into the hole. Although collar 83 has a slightly loose fit around the outside of port 38, bracket 50 can turn only a very limited amount about the axis of port 38 due to sides 60 and 62 of the yoke presenting interference to the vertical sides of the collar. Once the collar has been placed over and around outlet port 38, fitting 56 can then be connected.

Figure 4:
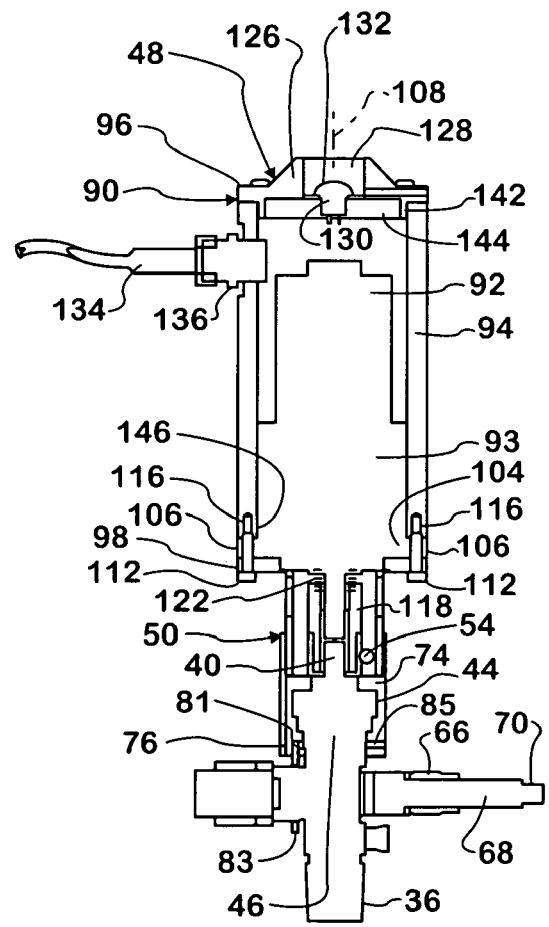
FIG. 4 is a cross section view in the direction of arrows 4-4 in FIG. 3.

Next yoke 52 is raised off the gas cylinder to the position shown by FIG. 4, and screw 68 is tightened to clamp the yoke to the valve body and engage fitting 56 as shown. This also prevents bracket 50 from falling off the valve. Motor assembly 48 is then placed over the valve with its axis generally aligned with valve axis 42 and lowered to telescope tube 102 inside the channel of bracket 50. In this way, bracket 50 forms a locating part for locating tube 102, the latter part being the located part.

Operative engagement of coupler 118 with stem 40 can be attained only when they have proper circumferential registration. If circumferential registration exists as the motor assembly is being placed on the valve, coupler 118 will attain rotatable coupling with stem 40. If the coupler and stem are out of registration, the coupler will contact the stem 40, but without attaining rotatable coupling, in which event button 132 can be depressed to jog motor 92 until registration occurs at which time the motor assembly may drop down slightly in a vertical installation as shown. The weight of the motor assembly will be borne by abutment of end plate 104 with ring 100 at the upper ends of the bracket 98 side walls, and resulting transmission of that weight through bracket 50 to port 38 by virtue of collar 83 resting on the port. Weight is not borne through coupler 118 although the coupler's engagement with the valve stem stabilizes the mounting.

For keeping the motor assembly in place on the valve, hitch pin 54 is inserted through hole 84 to pass through aligned holes 148 in opposite sides of tube 102 and then hole 86. The placement of holes 84, 148, and 86 provides for hitch pin 54 to clear valve 32. With the hitch pin in place, the motor assembly cannot be removed unless the hitch pin is first extracted. Removal of the valve closure system from the valve can be easily accomplished by lifting the motor assembly off the valve after the hitch pin has been extracted.

The telescopic engagement between the channel of bracket 50 and tube 102 keeps substantial axial alignment of the motor assembly to the valve stem as the motor assembly is being placed. Once the motor assembly has been placed, none of its weight is transmitted to yoke 52, and bracket 50 is free of contact with the yoke.

FIGS. 7-13 illustrate brackets 150, 198 representing modified forms of brackets 50 and 98.

Figure 9:
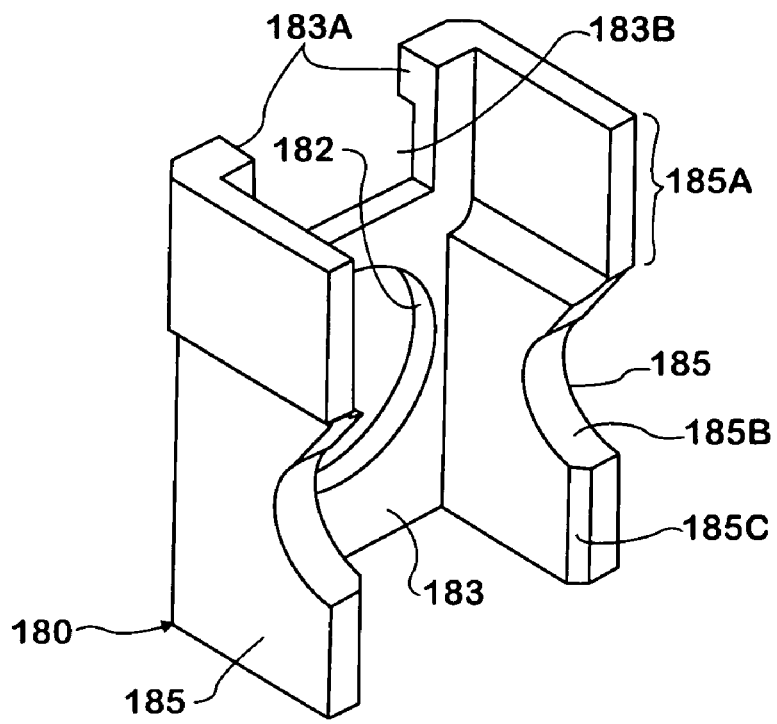
FIG. 9 is a perspective view of one of the pieces of the part shown in FIGS. 7 and 8.
Figure 10:
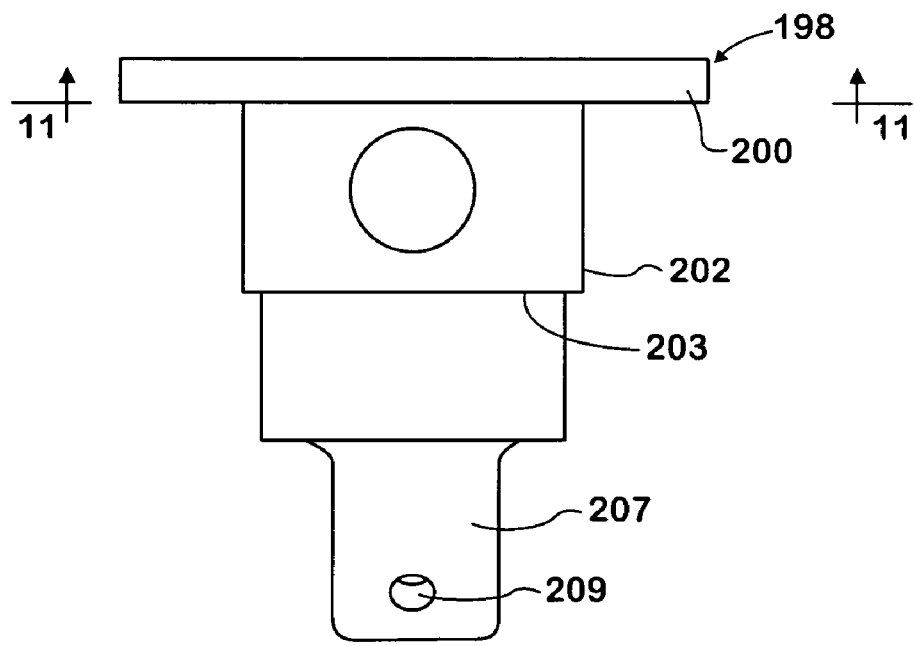
FIG. 10 is a front elevation view of another multi-piece part corresponding to, but different from, another of the parts previously described.
Figure 11:
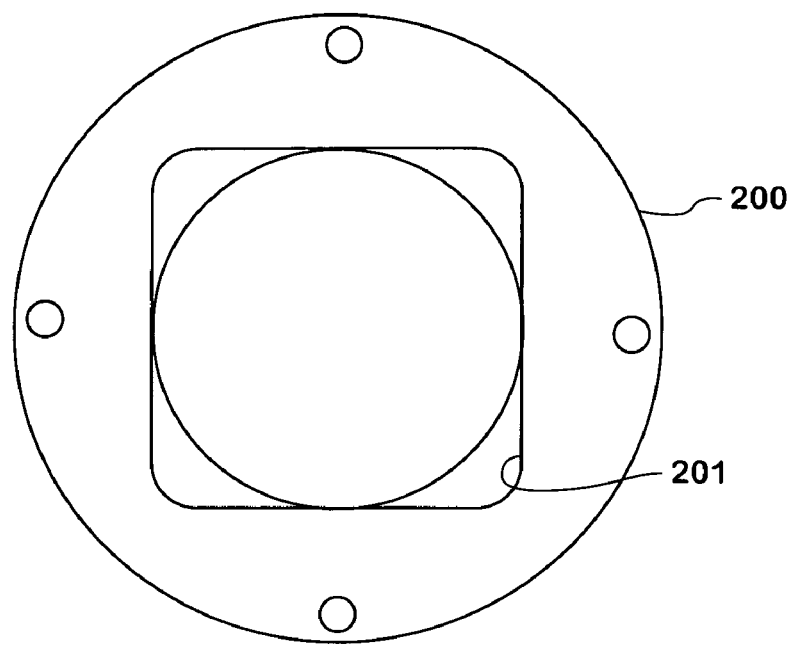
FIG. 11 is a view of one of the pieces of the part of FIG. 10, as taken in the direction of arrows 11-11 in FIG. 10.
Figure 12:
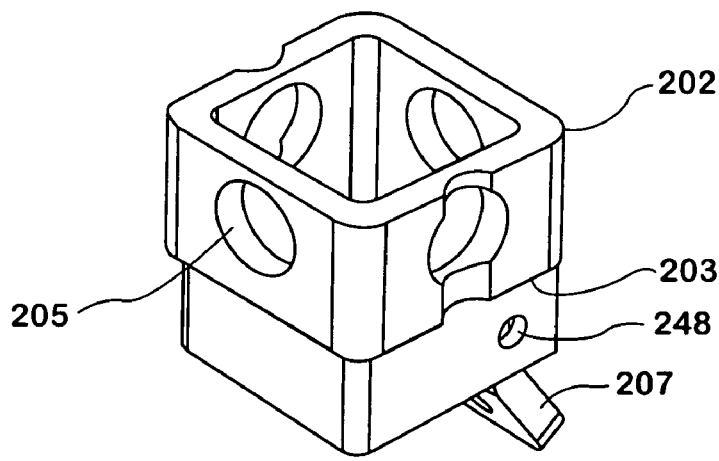
FIG. 12 is a perspective view of another of the pieces of the part shown in FIG. 10.

Bracket 150, like bracket 50, comprises three side walls 174, 176, and 178. It is a formed sheet metal part of suitable thickness. A piece 180 that is shown by itself in FIG. 9 is welded to bracket 150 to provide a collar 183 containing a circular through-hole 182. Piece 180 is a machined metal piece. Aligned through-holes 184, 186 are present at the upper corners of side walls 178, 174 but those two side walls unlike side walls 78, 74 are not rectangular in shape because the lower corners have been cut away.

Piece 180 differs from piece 80 by having full side walls 185 rather than merely two legs 85. Certain features of piece 180 have significance in relation to bracket 150 and to valve 32. The upper portions 185A of walls 185 have reduced thickness that provides horizontal dimensional clearance to the nuts of certain valves from which the valve stems emerge. Notches 185B and chamfers 185C provide clearance and facilitate installation for certain valves.

For controlling the horizontal dimension between the inner face of collar 183 and the centerline of through-holes 184, 186 so that the inner collar face can be disposed against the portion of the valve body adjoining port 36 and the hitch pin can pass through the telescoped brackets with a desired closeness to the valve body on the side opposite port 36, a ridge 183A is present at the top of the side wall containing the collar. A rectangular opening 183B is also present in that same side wall above through-hole 182 to provide for clearance to the valve. For controlling the vertical dimension between the centerline of through-hole 182 and the centerline of through-holes 184, 186, the height of ridge 183A is chosen such that the lower surface of the ridge and the lower surface of side wall 176 will be located against a common horizontal surface in a welding jig before the machined and formed pieces are welded together around the outside of the overlapping margins of three side walls.

Bracket 198, like bracket 98, has a flat circular ring 200, corresponding to ring 100, and a square tube 202, corresponding to tube 102, joined to and extending downward from, and coaxial with, ring 200. A face of ring 200 has a shallow recess 201 for locating tube 202 to it prior to the two pieces being welded together. Tube 202 comprises four apertured side walls dimensioned to provide the lower end portion of the tube below a shoulder 203 with a telescopic fit to bracket 150. One of the apertures 205 allow installer viewing of coupler 118 through the telescoped brackets. Shoulder 203 rests on the upper edge of bracket 150 when the motor is mounted on the valve. Through-holes 248 in opposite side walls align with through-holes 184, 186 to provide for passage of the hitch pin through both brackets to pin them together when the motor is in place on the valve.

A bent tab 207 containing a threaded through-hole 209 forms a continuation of the one side wall of tube 202 that is opposite collar 183. A thumbscrew 211 is threaded into hole 209 and can be tightened to cause its tip to bear against the backside of the valve body. In doing so the thumbscrew provides an adjustment for minimizing non-parallelism of the motor axis to the valve stem axis while relieving some of the weight being applied to the valve port on which collar 183 bears. Although it was mentioned in connection with FIGS. 1-6 that the valve stem doesn't bear any of the weight of the valve closure system, certain valve stems can bear some or all of the weight.

While a presently preferred embodiment of the invention has been illustrated and described, it should be appreciated that principles of the invention apply to all embodiments falling within the scope of the following claims.

What is claimed is:

1. A valve closure system for operating a valve of a fluid-containing vessel between an open and a closed position to allow and disallow communication of the interior of the vessel through the valve, the valve closure system comprising:
an operating part shaped to engage and rotate a rotary actuator protruding along an axis from a valve body to operate the valve from one position to another when the valve closure system is associated with the valve;
a motor for rotating the operating part about the axis;
a walled located part disposed on a housing of the motor; and a walled locating part shaped for mounting on the valve body, the walled parts respectively comprising respective walls shaped to mutually telescopically engage in a direction parallel to the axis when, with the walled locating part mounted on the valve body, the motor housing has been properly circumferentially and axially aligned with the locating part along the axis and then advanced axially to move the operating part toward engagement with the rotary actuator of the valve, the wall of the walled locating part being spaced from the valve body when the walled locating part is mounted on the valve body and having opposite faces that respectively face toward and away from the valve body, and the wall of the walled located part comprising opposite faces that respectively face toward and away from the valve body, one of which is disposed in confronting relation to one of the faces of the wall of the walled locating part when the walls are in mutual telescopic engagement.

2. A valve closure system as set forth in claim 1 wherein the wall of the walled located part on the motor housing is disposed in at least partially circumferentially surrounding relationship to the operating part.

3. A valve closure system as set forth in claim 2 wherein the wall of the walled located part on the motor housing comprises at least three sides, a first two of which are angularly related to a third and all three of which are parallel to the axis.

4. A valve closure system as set forth in claim 3 wherein the two sides which are angularly related to the third are mutually parallel and at right angles to the third.

5. A valve closure system as set forth in claim 4 wherein the wall of the walled located part on the motor housing comprises a fourth side that is parallel with the third side and that joins with the first two sides to render the wall of the walled located part on the motor housing fully circumferentially surrounding the operating part when the walls are in mutual telescopic engagement.

6. A valve closure system as set forth in claim 4 wherein the third side comprises an aperture through which the operating part can be seen.

7. A valve closure system as set forth in claim 3 wherein the wall of the walled locating part is shaped to at least partially circumferentially surround the rotary actuator of the valve when the walled locating part is mounted on the valve body and comprises three sides, each of which confronts a respective side of the walled located part when the walled locating and located parts are in mutual telescopic engagement.

8. A valve closure system as set forth in claim 7 including a hitch pin that separably associates with the walls for pinning them together at a certain amount of telescopic engagement.

9. A valve closure system as set forth in claim 1 in which the walled locating part is shaped to comprise a collar providing a through-hole for fitting onto a port of the valve body.

10. A valve closure system as set forth in claim 9 wherein the wall of the walled locating part comprises three sides, a first two of which are angularly related to a third and all three of which are parallel to the axis, and the collar extends from one of the three sides that is disposed between the other two of the three sides.

11. A valve closure system as set forth in claim 10 wherein the collar comprises a separate piece that is welded to the wall of the walled locating part.

12. A valve closure system as set forth in claim 1 wherein the walled located part comprises a shoulder that rests on the walled locating part when the walled locating and located parts are in maximum mutual telescopic engagement.

13. A valve closure system as set forth in claim 12 wherein the walled located part comprises a bent tab having a threaded through-hole into which a screw is threaded for engagement with the valve to align the axis of the operating part to that of the rotary actuator while the shoulder is resting on the walled locating part.

14. A valve closure system as set forth in claim 1 wherein the motor is electric-operated and including a jogging switch disposed on the motor housing for jogging the motor to turn the operating part to a proper position for engagement with the rotary actuator of the valve.

15. A valve closure system as set forth in claim 14 wherein the jogging switch is disposed on an axial end wall of the housing opposite an axial end at which the operating part is disposed.

16. A valve closure system as set forth in claim 15 wherein the jogging switch comprises a pushbutton actuator that is disposed within a walled cavity and that is depressed axially toward the motor to jog the motor.

17. A valve closure system as set forth in claim 1 including a planetary gear mechanism through which the motor turns the operating part.

18. A method of associating a motor-operated valve closure system with a valve of a fluid-containing vessel for operating the valve, via a rotary actuator of the valve, between an open and a closed position to allow and disallow communication of the interior of the vessel through the valve, the method comprising:
circumferentially and axially aligning a located part on the motor with a locating part on the valve and advancing the motor toward the valve to mutually telescopically engage respective walls of the located and locating parts and couple an operating part coupled to the motor to the rotary actuator to couple the rotary actuator to the motor, including, after the located and locating parts have been mutually telescopically engaged and the motor advanced to place the operating part in contact with, but not yet rotatably coupled to, the rotary actuator, jogging the motor to cause the operating part to become rotatably coupled to the rotary actuator.

19. A method as set forth in claim 18 wherein the step of jogging the motor comprises depressing a pushbutton actuator that is disposed within a walled cavity at an axial end wall of the housing opposite an axial end at which the operating part is disposed.

20. A method of associating a motor-operated valve closure system with a valve of a fluid-containing vessel for operating the valve, via a rotary actuator of the valve, between an open and a closed position to allow and disallow communication of the interior of the vessel through the valve, the method comprising:
circumferentially and axially aligning a located part on the motor with a locating part on the valve and advancing the motor toward the valve to mutually telescopically engage respective walls of the located and locating parts and couple an operating part coupled to the motor to the rotary actuator to couple the rotary actuator to the motor, including associating the locating part with the valve prior to the steps of circumferentially and axially aligning the located part with the locating part and advancing the motor toward the valve, and wherein the step of associating the locating part with the valve comprises placing a collar of the locating part over a port of the valve.

21. A valve closure system for operating a valve of a fluid-containing vessel between an open and a closed position to allow and disallow communication of the interior of the vessel through the valve, the valve closure system comprising:

an operating part shaped to engage and rotate a rotary actuator protruding along an axis from a valve body to operate the valve from one position to another when the valve closure system is operationally associated with the valve;

a motor for rotating the operating part about the axis;

a walled located part disposed on a housing of the motor;

and a walled locating part shaped for mounting on the valve body, the walled parts respectively comprising respective walls shaped to mutually telescopically engage in a direction parallel to the axis when, with the walled locating part mounted on the valve, the motor housing has been properly circumferentially and axially aligned with the walled locating part and then advanced to move the operating part toward engagement with the rotary actuator of the valve, the walls of the walled parts both being spaced from the valve body, and when the valve closure system is operationally associated with the valve, weight of the motor is transmitted through the walled located part to the walled locating part and through the walled locating part to the valve body.

* * * * *